United States Patent Office 3,040,033
Patented June 19, 1962

3,040,033
NEW PENICILLINS
Walter D. Celmer, Garden City, N.Y., assignor to Chas. Pfizer & Co. Inc., Brooklyn, N.Y., a corporation of Delaware
No Drawing. Filed Oct. 2, 1959, Ser. No. 843,932
6 Claims. (Cl. 260—239.1)

This invention relates to new antibiotic compounds and their salts and, more particularly, to novel penicillins and their salts.

The various penicillin compounds available, all of which are currently produced biosynthetically occupy an invaluable role in the armament of the physician.

The term "penicillin" includes a number of compounds which differ only in the nature of the R group and possess the general formula $$R-\overset{O}{\overset{\|}{C}}-NH-CH-CH\underset{O=C-N-CH-COOH}{\overset{S}{\diagup}\diagdown\overset{CH_3}{\diagup}\diagdown CH_3} \quad (I)$$

The properties of a particular penicillin are determined by the R group. The best known and most widely used penicillins are benzylpenicillin and phenoxymethylpenicillin wherein R represents the benzyl- and phenoxymethyl- radicals. Benzylpenicillin, while effective via parenteral administration is of lower therapeutic efficiency via oral administration. Phenoxymethylpenicillin, on the other hand exhibits pronounced therapeutic activity via oral administration. However, its rate of absorption and subsequent degradation within the animal body to therapeutically ineffective products makes desirable the availability of penicillins in which these disadvantages are absent.

There has now been discovered a series of novel penicillins and their salts which, while active via both oral and parenteral administration, are particularly active via oral administration. The novel compounds of the present invention have in the acid form, the formula $$\langle\bigcirc\rangle-CH=CH-S-CH_2-\overset{O}{\overset{\|}{C}}-NH-CH-CH\underset{O=C-N-CH-COOH}{\overset{S}{\diagup}\diagdown\overset{CH_3}{\diagup}\diagdown CH_3} \quad (II)$$

By virtue of the double bond in the styryl moiety of the side chain these novel compounds can exist as geometrical isomers. Therefore, included within the purview of this invention are the cis- and trans- isomers corresponding to Formula II above.

Included also in the present invention are the non-toxic salts of these novel penicillins, that is, non-toxic metal salts such as the sodium and potassium salts and, non-toxic ammonium and substituted ammonium salts, for example, salts of such non-toxic amines as procaine, dibenzylamine, N,N'-dibenzylethylenediamine, 1-ephenamine, N-benzyl-β-phenethylamine and other amines which have been used to form salts with benzylpenicillin.

These valuable and novel penicillins, while possessing antibacterial spectra similar to those of phenoxymethylpenicillin and phenylthiomethylpenicillin against both Gram-positive and Gram-negative microorganisms, are characterized by faster rates of absorption and high initial blood serum levels in the animal, including the human, body. For example, trans-styrylmercaptomethylpenicillin, when administered orally to humans as the sodium salt, equivalent to 250 mg. of free acid, produces the following mean blood serum levels in the number of test subjects indicated. The data are compared with phenoxymethylpenicillin run at the same dosage rate in the acid form.

A comparison of blood serum levels realized with the potassium salt of trans-styrylmercaptomethylpenicillin with those obtained with potassium phenoxymethylpenicillin (Test C) demonstrate the significantly greater and more sustained blood serum levels possible with this valuable compound via oral ingestion.

The blood levels obtained with the sodium salt of trans-styrylmercaptomethylpenicillin agree favorably with those found for the potassium salt. The two salts thus appear equivalent.

TABLE I

*Human Blood Serum Levels (µg./ml.) Of Trans-Styrylmercaptomethylphenicillin*

TEST A

| Penicillin | Subjects | 0.5 | 1 | 3 | 6 hours, µg./ml. |
|---|---|---|---|---|---|
| Trans-styrylmercapto-methyl-sodium salt | 18 | 1.507 | 2.360 | 0.372 | 0.036 |
| Phenoxymethyl-acid form | 16 | -------- | 1.788 | 0.901 | 0.051 |

TEST B

| Trans-styrylmercapto-methyl-sodium salt | 17 | -------- | 2.731 | 0.458 | -------- |
|---|---|---|---|---|---|
| Phenoxymethyl-acid form | 19 | -------- | 0.735 | 0.348 | -------- |

TEST C

| Penicillin (potassium salts) [1] | 0.5 | 1 | 2 | 3 hours |
|---|---|---|---|---|
| Trans-styrylmercaptomethyl | 1.954 | 2.635 | 0.886 | 0.326 |
| Phenoxymethyl | 0.893 | 1.326 | 0.540 | 0.178 |

[1] A cross over design experiment with 24 subjects.

Trans-styrylmercaptomethylpenicillin sodium salt (Tests A and B) is thus seen to produce high initial therapeutic levels of antibiotic relative to the levels achieved with the currently used phenoxymethylpenicillin. The initial high blood serum levels, indicative of a rapid rate of absorption, point to sodium trans-styrylmercaptomethylpenicillin as a more satisfactory preparation than the widely used phenoxymethylpenicillin for oral therapy in cases wherein a patient's condition demands an initial and rapid high penicillemia value.

Similar activity is demonstrated by the cis-isomer. The significant activity of the compounds of this invention via the oral route plus the greater safety and convenience of oral therapy relative to parenteral therapy make these compounds of great value to the medical profession.

The above described advantageous features of the novel penicillins of the present invention permit the administration of these valuable products at dosage rates of approximately the same order of magnitude as, for example, phenoxymethylpenicillin. The particular regimen and dosage adopted, however, will be assessed by the physician according to the age, weight and condition of the patient.

The valuable products of this invention, trans-styrylmercaptomethylpenicillin, for example, are remarkably effective in treating a number of infections in animals including man. For this purpose the pure material or mixtures thereof with other antibiotics can be employed. In order to do this for administration to man and animals, a non-toxic carrier, that is, a carrier which is non-toxic when administered in a quantity sufficient to provide the required dosage of trans-styrylmercaptomethylpenicillin is selected. This may be either a pharmaceutical carrier, either a liquid or solid, such as water, aqueous ethanol, syrup, isotonic saline or glucose, starch, lactose, calcium phosphate, or animal feed stuff. Either oral or parenteral administration is satisfactory. However, because of the increased blood serum levels realized the oral route is preferred.

The novel and valuable compounds of the present invention, can be prepared from 6-aminopenicillanic acid by any of several known methods for introducing an acyl substituent into a primary amine, and by microbiological fermentation utilizing the appropriate styrylmercaptomethylacetic acid or equivalent thereof e.g. esters, anhydrides or amides and salts thereof, styrylmercaptoethanol, and simple derivatives thereof as precursor compound in the nutrient medium wherein a penicillin-producing mold is growing.

They can, for example, be prepared by the acylation of 6-aminopenicillanic acid according to the procedure described by Huang in U.S. patent application, Serial Number 820,578, filed June 16, 1959, which utilizes the reaction of 6-aminopenicillanic acid with the appropriate (1) substituted acylchloride, e.g., trans-styrylmercaptoacetyl chloride, (2) substituted acid anhydride, e.g. trans-styrylmercaptoacetylanhydride, (3) mixed anhydrides such as t-butoxyformic trans-styrylmercaptoacetyl anhydride. Alternatively, they can be prepared by the reaction of 6-aminopenicillanic acid with a carbodiimide, such as 1,3-dicyclohexylcarbodiimide, and the proper substituted alkanoic acid, e.g. trans-styrylmercaptoacetic acid. Suitable starting materials are:

Trans-styrylmercaptoacetic acid
Cis-styrylmercaptoacetic acid and acid chlorides and anhydrides thereof. The acid chlorides are best prepared via the well known reaction of oxalylchloride with the appropriate acid. The acid chlorides need not be separated from the reaction mixture. Satisfactory results are obtained using the acid chloride reaction mixture obtained following removal of the reaction solvent.

They can also be prepared by the method of Sheehan et al., Journal of the American Chemical Society, 81, 3089 (1959), which utilizes the reaction of D-penicillamine and t-butyl phthalimidomalonaldehydrate as starting materials for a series of reactions. Substitution of the chloride utilized by Sheehan et al., by, for example, trans-styrylmercapto-acetylchloride in the reaction sequence produces trans-styrylmercaptomethylpenicillin potassium salt.

The isomeric styrylmercaptoacetic acids are prepared from phenylacetylene and thioglycolic acid according to the procedure of Holmberg, Arkiv. Kemi, 2, 567 (1950). The isomer herein designated as trans corresponds to the B isomer described by Holmberg. The cis-isomer referred to herein corresponds to the isomeric A compound of Holmberg.

It is preferred to utilize the reaction of 6-aminopenicillanic acid with the appropriate substituted alkanoic acid, such as trans-styrylmercaptoacetyl chloride, in the presence of an acid acceptor at a neutral to moderately alkaline pH level, that is, at pH values of from about 6.0 to about 9.0, since this process produces substantial yields of the desired product.

When prepared in this manner the novel penicillins are obtained as the sodium or potassium salts. They are readily converted to the acid form by neutralization with a mineral acid, such as sulfuric or hydrochloric acids, and are recovered by filtration or centrifugation of the precipitated acid.

The acid forms of the novel penicillins of the present invention are, in turn, easily converted to salts by reaction with a suitable base. Thus, treatment of the desired penicillin in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, 1-ephenamine and N-benzyl-β-phenethylamine salts, are prepared by reacting a solution of the appropriate penicillin in an aqueous or non-aqueous solvent with the desired amine. Alternatively, the amine salts are prepared in aqueous solution by reacting a metal salt of the the desired penicillin, e.g. the sodium salt, with the desired amine acid salt, for example, the amine hydrochloride salt.

The cis- and trans-styrylmercaptomethylpenicillins differ in their infrared and ultraviolet absorption spectra; the absorption maximum for the cis-isomer occurring at a lower wave length than that of the trans-isomer. In the ultraviolet region, for example, the cis-form, as the potassium salt in aqueous solution, has maximum absorption at 280–281 mu., whereas the trans-isomer under similar conditions exhibits maximum absorption at 286–287 mu. These differences parallel the differences noted in the precursor styrylmercaptoacetic acids.

The analogous styryloxymethylpenicillins, wherein oxygen replaces sulfur in the side chain, are prepared in a similar manner. They also demonstrate valuable therapeutic activity.

The following examples are provided to further illustrate in detail methods for the procedure of the present invention. They are, however, not to be construed as limiting the invention in any way.

EXAMPLE I

Cis- and Trans-Styrylmercaptoacetic Acid

The cis- and trans-isomers of styrylmercaptoacetic acid are prepared according to the method of Holmberg (Loc. Cit.). A study of the so-called A and B forms of styrylmercaptoacetic acid described by Holmberg revealed differences in their ultraviolet (282 and 287 mu. maximum, respectively) and infrared absorption spectra which are attributed to differences in their geometric configuration. Planar projections of the two structural forms reveal a shorter length of the chromophore of the A-form as manifested by ultraviolet absorption maximum than that of the corresponding B-form. Such differences in ultraviolet absorption maxima are generally attributed to cis- and trans-isomerism. Accordingly, cis- and trans-configurations are assigned to the A and B forms described by Holmberg, respectively.

Cis-Styrylmercaptoacetyl Chloride

A solution of cis-styrylmercaptoacetic acid (12.5 gms.) in dried benzene (75 ml.) is treated with excess oxalyl chloride (25 gms.) at room temperature in a 500 ml., single-necked, round bottom flask. The flask is stoppered with a calcium chloride drying tube and allowed to stand overnight. At the end of this time reaction is complete as evidenced by the absence of gas evolution. The flask is then equipped with a distillation head and subjected to vacuum distillation to remove the excess oxalyl chloride and most of the solvent. The residue of acid chloride is used without further purification in the reaction with 6-aminopenicillanic acid.

Trans-styrylmercaptoacetyl chloride is prepared in the same manner.

Cis-Styrylmercaptomethylpenicillin

The cis-styrylmercaptoacetyl chloride reaction product described above is added dropwise to a stirred and chilled solution containing 6-aminopenicillanic acid (16.8 gms.), sodium bicarbonate (28 gms.) and 450 ml. of water at 5° C. over a 30 minute period. The small amount of acid chloride which crystallizes in the additional funnel is washed into the reaction mixture with 15 ml. of acetone. The reaction is allowed to proceed for a total of 75 minutes during which time the temperature is allowed to rise gradually to 21.5° C. The reaction mixture is then filtered, the filtrate chilled to 5° C. and adjusted to pH 2.8 with 50% phosphoric acid while being stirred over 200 ml. of trichloroethylene. The insoluble precipitate which forms at the interface of the two layers is collected and rapidly dissolved in 200 ml. of methylethylketone.

The methylethylketone solution is then adjusted to pH 7 with 8.5 N aqueous potassium hydroxide with efficient stirring. The crystalline potassium salt of cis-styrylmercaptomethylpenicillin which separates out within a few minutes is recovered by filtration, washed with methylethylketone and dried in a desiccator. Additional crystalline potassium salt is recovered by concentrating the mother liquor.

Substitution of sodium hydroxide for potassium hydroxide produces the sodium salt of cis-styrylmercaptomethylpenicillin.

EXAMPLE II

The procedure of Example I is repeated but using trans-styrylmercaptoacetyl chloride as acylating agent in place of the cis-isomer to give the crystalline potassium and sodium salts of trans-styrylmercaptomethylpenicillin.

EXAMPLE III

To a solution of 0.194 g. of trans-styrylmercaptoacetic acid in 10 ml. of tetrahydrofuran there is added 0.204 g. of 1,3-dicyclohexylcarbodiimide in 5 ml. of tetrahydrofuran and a solution of 0.216 g. of 6-aminopenicillanic acid in 20 ml. of water; tetrahydrofuran (1:1) containing sufficient sodium bicarbonate to give a clear solution. The mixture is allowed to stand at room temperature for one hour. It is then diluted with water, filtered to remove 1,3-dicyclohexylurea and unreacted 1,3-dicyclohexylcarbodiimide and worked up according to the procedure of Example I.

In like manner, cis-styryl-mercaptomethylpenicillin is produced.

EXAMPLE IV

A solution of trans-styrylmercaptoacetic acid (0.388 g.) and triethylamine (0.3 ml.) in 10 ml. of dry acetone is thoroughly stirred and cooled to −5° C. A solution of t-butyl chlorocarbonate (0.2 ml.) in 3 ml. of dry acetone is added dropwise and, after 15 minutes, the mixture containing t-butoxyformic-trans-styrylmercaptoacetyl anhydride and triethylamine hydrochloride, cooled to −50° C. It is slowly added to a solution of 6-aminopenicillanic acid (0.430 g.) in 20 ml. of 3% sodium bicarbonate and 5 ml. of acetone, the temperature being held at 0°–5° C. The reaction mixture is then allowed to reach temperature and, after one-half hour is acidified to pH 2.2 with phosphoric acid and extracted with ether. The ether extract is then passed through a phosphate buffered (pH 6.0) silica column; the column developed with ether-methanol solution and eluted with a dilute phosphate buffer at pH 7.0. The eluate is acidified to pH 2.2 with phosphoric acid and the acid eluate extracted with ether. The ether solution is then extracted with dilute potassium hydroxide and the potassium salt recovered therefrom by freeze drying.

EXAMPLE V

Acidification of aqueous solutions of the products of Examples I and II to pH 2.8 with 6 N hydrochloric acid precipitates the acid forms of cis- and trans-styrylmercaptomethylpenicillin. The acids are removed by suction-filtration, washed with cold water and dried in vacuo.

EXAMPLE VI

The ammonium salts of cis- and trans-styrylmercaptomethylpenicillin are prepared by neutralizing a suspension of the appropriate acid (0.001 mole) in 20 ml. of water with an equimolar quantity of ammonium hydroxide. The salts are isolated by freeze drying.

In addition, compounds corresponding to Formula II wherein one or more substituents are attached to the methylene adjacent to the carbonyl group of the penicillin moiety are also valuable antibiotics. Such substituents are lower alkyl, lower alkoxyl, hydroxyl, nitro, acyloxy, nitro, halogen, phenoxy and carbethoxy. Also of therapeutic value are the compounds wherein one of the above substituents is present in the phenyl moiety. The isomeric penicillins, 3 - phenylmercapto - 2 - propenylpenicillin, in which the positions of the vinyl and sulfur groups are interchanged are also of value as therapeutic agents.

What is claimed is:

1. A compound selected from the group consisting of those having the formula

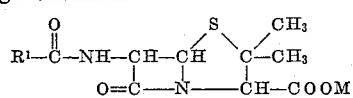

wherein $R^1$ is selected from the group consisting of

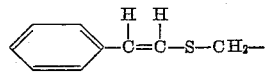

and

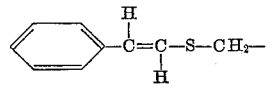

and M is selected from the group consisting of hydrogen, sodium, potassium, and ammonium.

2. The potassium salt of trans-styrylmercaptomethylpenicillin.

3. The sodium salt of trans-styrylmercaptomethylpenicillin.

4. The potassium salt of cis-styrylmercaptomethylpenicillin.

5. The sodium salt of cis-styrylmercaptomethylpenicillin.

6. Trans-styrylmercaptomethylpenicillin.

References Cited in the file of this patent

UNITED STATES PATENTS

| | | |
|---|---|---|
| 2,479,296 | Behrens et al. | Aug. 16, 1949 |
| 2,479,297 | Behrens et al. | Aug. 16, 1949 |
| 2,623,876 | Behrens et al. | Dec. 30, 1952 |